US011010697B1

(12) United States Patent
Liu et al.

(10) Patent No.: US 11,010,697 B1
(45) Date of Patent: May 18, 2021

(54) ON-DEMAND RESOURCE SCHEDULING

(71) Applicant: Amazon Technologies, Inc., Seattle, WA (US)

(72) Inventors: Senmao Liu, Seattle, WA (US); Jose Ramon Algara Allegre, Seattle, WA (US); Rowan William Hale, Seattle, WA (US); Eric M. Hayward, Burien, WA (US); Ziyan Huang, Bellevue, WA (US); Jingnan Li, Seattle, WA (US); Robert Dreaper McDonald, Jr., Snoqualmie, WA (US); Carl Morris, Seattle, WA (US); Wilko Ziggy Schulz-Mahlendorf, Seattle, WA (US); Sharath Selvaraj, Redmond, WA (US); Kreethigha Thinakaran, Toronto (CA)

(73) Assignee: Amazon Technologies, Inc., Seattle, WA (US)

(*) Notice: Subject to any disclaimer, the term of this patent is extended or adjusted under 35 U.S.C. 154(b) by 446 days.

(21) Appl. No.: 15/896,872

(22) Filed: Feb. 14, 2018

(51) Int. Cl.
*G06Q 10/06* (2012.01)
*G06Q 10/08* (2012.01)
*G06Q 50/28* (2012.01)
*G06N 20/00* (2019.01)
*G06Q 10/04* (2012.01)

(52) U.S. Cl.
CPC ....... *G06Q 10/06311* (2013.01); *G06N 20/00* (2019.01); *G06Q 10/0835* (2013.01); *G06Q 10/0838* (2013.01); *G06Q 50/28* (2013.01); *G06Q 10/04* (2013.01)

(58) Field of Classification Search
CPC ........ G06Q 10/06311; G06Q 10/0835; G06Q 10/0838; G06Q 50/28; G06Q 10/04; G06N 20/00
USPC ........................................... 705/7.13
See application file for complete search history.

(56) References Cited

U.S. PATENT DOCUMENTS

| | | | |
|---|---|---|---|
| 2013/0339266 A1* | 12/2013 | Looman | G05D 1/0291 |
| | | | 705/338 |
| 2018/0374021 A1* | 12/2018 | Drayton | G01C 21/3484 |
| 2019/0180229 A1* | 6/2019 | Phillips | G06F 16/29 |

OTHER PUBLICATIONS

Marcel Kunkel, Vehicle Routing with Driver Learning for Real World CEP Problems, Nov. 8, 2011 (Year: 2011).*

* cited by examiner

*Primary Examiner* — Charles Guiliano
*Assistant Examiner* — Po Han Lee
(74) *Attorney, Agent, or Firm* — Knobbe, Martens, Olson & Bear, LLP (57) ABSTRACT

Features related to a system and method for scheduling a resources to perform discrete tasks are described. The scheduling features include generating schedules predicted to appeal to the tasked resource (e.g., delivery partner) such as by time, day of the week, location, item types, etc. Using machine learning, the schedule and terms thereof can be dynamically generated to suit the tastes of each tasked resource and the overall demand for services. Using historical data, the modeling also accounts for likelihood an offer will be accepted and risk of cancellation for a given resource. The machine learning may be based on a mixed integer problem as constrained by partner and system capacity parameters.

20 Claims, 6 Drawing Sheets

ON-DEMAND RESOURCE SCHEDULING

BACKGROUND

The future is unknowable. This uncertainty presents many issues particularly in the field of delivery planning. If the future was known, the proper number of resources could be acquired today to ensure that an efficient quantity is on hand tomorrow to satisfy an expected demand. The pool of resources which may be scheduled can be referred to as on-demand resources because the resources are available, upon request, to perform certain tasks.

An efficient quantity of resources may represent the point where the amount of capacity to perform a task (e.g., deliveries, message transmission, etc.) that is scheduled meets the expected future need. The difficulty in scheduling may be compounded by dynamic forces that may cause changes the available delivery capacity. For example, creating a schedule does not account for situations where a scheduled resource rejects a task assignment or fails to complete an assigned task. Furthermore, the resources needed to transmit individual schedule offers to selected resources may be limited. Thus, each request consumes a portion of the limited transmission resources. Generating a schedule that utilizes resources and accounts for these dynamic factors can lead to scheduling error or inefficiencies as the various factors are included in the scheduling process.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to a scheduling system that generates schedules for on-demand resources (e.g., delivery partners) for a time and area. The schedules are generated in consideration of the specific behaviors of the resources available at the time in the given area. A schedule may include a task allocation to a resource. The resource may or may not accept and complete the task. The features described include artificial intelligence to estimate the behavior of the resource when generating a schedule. In this way, a schedule is generated that assigns resources to specific tasks that will be accepted and filled.

The features described herein address a variety of problems in the field of scheduling for on-demand resources. One issue addressed is reducing the mismatch between resource demand and preferences of the resources. In some cases, there is unfilled for service demand while at the same time a portion of the resources offered work may decline at a rate of 22% or more. Furthermore, of the remaining resources available to provide service, 33% or more may not be offered any work. In addition to the disconnect between the demand and the amount of work willing to be accepted, this mismatch can also create significant resource bottlenecks as an initial schedule is generated and offers transmitted to a first set of resources. Then, based on the responses, additional scheduling and offering may occur to ensure the requested demand is fulfilled. Each iteration of scheduling, transmitting offers, and processing offer responses can be resource intensive for the systems used to schedule, transmit and process the schedule information.

Given the number of dynamic parameters included in on-demand resource scheduling, typical scheduling systems may fail to converge on a schedule in a meaningful period of time using a reasonable set of resources. The features described introduce intelligence to the scheduling process and help bridge a disconnect between the demand for resources and the supply of resources.

Although the embodiments may reference scheduling delivery partners for delivery tasks, the scheduling features may be applied to schedule other task resources, human or machine, to perform discrete tasks at specified times. For example, data transmissions at specific times may be offered to different transmission partners. Each partner may have unique capacity constraints that make it more likely that one partner is better suited to transmitting data during business hours (e.g., Monday through Friday 9 am-5 pm) while another is more likely to accept a transmission task during evenings or weekends.

Embodiments of the scheduling features described may include offer prediction information for the resources. The offer prediction information may be generated using a machine learning model trained on previous behavior of the resource. For example, a likelihood of whether a resource accepts a task offer for a particular day of the week and time slot may be determined based on previous responses to offers at or near the day of the week and time. The likelihood that tasks accepted for a given day or time are actually completed may be generated based on previous tasks accepted at or near the day of the week and time. The machine learning model may receive, as input values, previous behavior information (e.g., vector of values) for the resource and generate the offer prediction information for the resource. Table 1 illustrates one representation of offer prediction information that may be generated for a hypothetical delivery partner. The representation in Table 1 may be referred to as a probabilistic scorecard for a delivery partner indicating a probability that the delivery partner will accept and successfully complete a delivery for a timeslot on a given day of the week.

TABLE 1

| Exclusive Offers | Sun | Mon | Tues | Wed | Thurs | Fri | Sat |
|---|---|---|---|---|---|---|---|
| Morning (8 am-12 pm) | 95% | 85% | 78% | 70% | 68% | 90% | 95% |
| Afternoon (12 pm-4 pm) | 89% | 80% | 76% | 68% | 60% | 84% | 87% |

TABLE 1-continued

| Exclusive Offers | Sun | Mon | Tues | Wed | Thurs | Fri | Sat |
|---|---|---|---|---|---|---|---|
| After Work (4 pm-8 pm) | 84% | 78% | 69% | 52% | 46% | 80% | 82% |
| Night (8 pm-8 am) | 70% | 66% | 62% | 45% | 33% | 69% | 72% |

The example shown in Table 1 clearly reveals the delivery partner's personalized scheduling preference of exclusive offers—she is a weekend and morning type having higher probabilities for accepting and completing deliveries scheduled before 8 PM on Fridays, Saturdays, Sundays, and Mondays. More generally, the offer prediction information under different offer attributes provides insight on both the taste variation over delivery partner populations for a specific offer (e.g., day, time, or incentive) and the delivery partner's personalized scheduling preference for different offer attributes. One concrete use case for the former would be to identify offers for hard-to-fill blocks, such as Friday 6-8 PM blocks. The features described may identify available delivery partners with the highest likelihood of attending and completing the scheduled deliveries.

Figure 1:
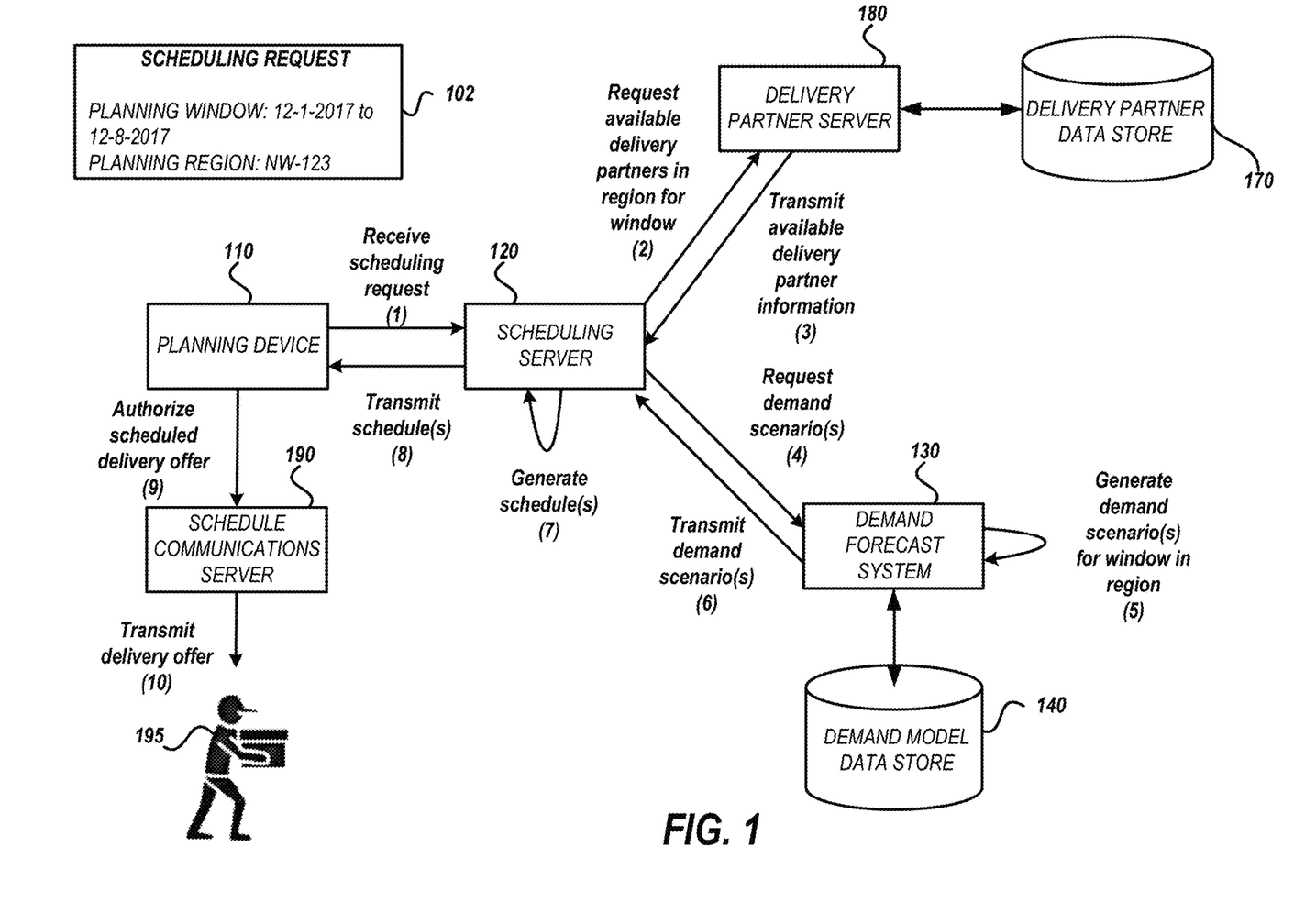
FIG. 1 is a pictorial diagram depicting a data flow for processing a scheduling request, the scheduling request being provided to a scheduling server that generates an estimated schedule for the scheduling request considering available delivery partners.

FIG. 1 is a pictorial diagram depicting a data flow for processing a scheduling request, the scheduling request being provided to a scheduling server that generates an estimated schedule for the scheduling request considering available delivery partners. The scheduling request 102 may include one or more of a planning window indicating a time for which the schedule is generated or a planning region indicating an area for which the schedule is generated. The scheduling request 102 may include additional parameters for scheduling such as: incentives to include with an offer, resources to omit from the schedule (e.g., resources on vacation status or adversely impacted such as by severe weather), resources that must appear in the schedule, or a specific project or program to be scheduled. For example, different delivery partners may be associated with a variety of projects or programs each having different requirements or criteria for delivering item (e.g., signature required, deliveries to business locations only, etc.). In such instances, the scheduling request 102 may identify a program or project to be scheduled and only resources eligible for the program or project may be considered for the schedule.

The scheduling request 102 may be included in a message received from a planning device 110 by a scheduling server 120. The scheduling request 102 may be received by the planning device 110 through a user interface specifically configured to receive, transmit, and present scheduling information.

The scheduling server 120 may request one or more available delivery partners within the region for the specified time from a delivery partner server 180. The request may include information identifying the requested time and region. The delivery partner server 180 may use the information included in the request to identify one or more available delivery partners. The delivery partner server 180 may identify available delivery partners based on delivery partner information stored in a delivery partner data store 170. The delivery partner data store 170 may include offer prediction information for an available resource, such as that shown in Table 1. The delivery partner server 180 may periodically generate the offer prediction information. For example, a schedule may indicate when offer prediction information is to be generated for delivery partners. The schedule may be associated with an area such that the number of offer predictions generated can be controlled. In some implementations, if the scheduling request 102 includes incentives, the delivery partner server 180 may generate specific offer prediction information based on the specified incentives. In some implementations, the delivery partner server 180 may dynamically assess at least a portion of delivery events for a delivery partner logged in the delivery partner data store 170. The delivery events may indicate behavior of particular delivery partners in response to offers (e.g., specific time, day of the week, incentive, offer communication mode). Behavior for a delivery partner may also be inferred based on when offers are viewed, when responses are received, the time between viewing an offer and responding to the offer, survey responses, or other interactions with the delivery partner. In some implementations, the offers may be provided through a scheduling application. A delivery partner's interactions with the scheduling application may be additional behavior data for predicting whether the delivery partner will accept a given offer for work. These historical behavior data points may be used to retrain the machine learning model that provides the offer prediction information or may be used as inputs to generate offer prediction information for a delivery resource.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

The scheduling server 120 may request one or more forecasted demand scenarios from a demand forecast system 130. The request may include information included in the received scheduling request 102 such as the planning window or planning region. The information included in the request received by the demand forecast system 130 may be used, at least in part, to select one or more demand forecasting models and as input values to a selected demand forecast model.

A demand forecast model may be a machine learning model trained to receive a set of input values and generate a demand forecast for delivery resources based on the input values. The demand forecast may include an estimated demand quantity and a probability for the estimate. The demand forecast model may be trained using training data. The training data may include, for example, input training data based on previous item deliveries within the region at the same or similar times as requested. The training result data provided to the machine learning model may be split into training data and test data, as is known in the art of machine learning. For example, a certain percentage of the training data may be provided to train a model to assign weights to various attributes, and then the remaining training data may be used to test the model's prediction capability for demand for the delivery resources under the provided delivery forecast input values. The training data results (e.g., estimated demand for the provided input values) may have been initially determined by a retailer, a manufacturer, a distributor, a delivery partner, consumer surveys, and/or by other methods.

A delivery forecast model may be associated with assumptions that indicate whether certain input values are more or less influential in the delivery demand forecast. For example, if delivery service is being provided to a relatively new region, the expected growth in popularity for the service in the region may indicate a more rapid increase in demand than for a region with a longer history of delivery service. Thus, the inputs to the model related to demand increases may be weighted or adjusted to correspond to the desired scenario.

Forecast models may be stored in a demand model data store 140. The forecast models may be indexed to facilitate efficient identification and retrieval of relevant models by the demand forecast system 130. For example, the models may be indexed by region such that forecast models for a region can be quickly retrieved based on an identifier of the region.

The demand forecast system 130 may receive the request for the demand scenarios. Using the information included in the request, the demand forecast system 130 may identify one or more demand models included in the demand model data store 140 and generate the demand scenario(s) for the requested planning window for the planning region.

The scheduling server 120 may then generate a schedule for each of the demand scenario(s). The schedule may include consideration of predicted delivery partner responses to specific delivery offers under varying demand scenarios. Further details of the scheduling process are provided below.

The schedule may be transmitted from the scheduling server 120 to the planning device 110. The transmission may include a message that initiates a display of a user interface to present the schedule. In some implementations, the transmission may include information about the demand scenario used to generate the schedule.

The transmission may be a one-time transmission, such as in response to receiving the scheduling request 102. In some implementations, it may be desirable to monitor the demand forecast system 130 to identify updates in the models used to generate a demand scenario that was used to generate a schedule. In such instances, upon detecting an update to a model, the scheduling server 120 may generate a new schedule for the region and planning window. If the new schedule differs from the original schedule or the difference is above a threshold, the scheduling server 120 may initiate transmission of a message to the planning device 110 that received the original schedule. For example, the original schedule may be stored by the scheduling server 120 along with contact information for the planning device 110 (or user associated therewith). Using stored contact information stored, the scheduling server 120 may transmit a message including the updated schedule to the planning device 110. The difference between two schedules may be measured by, for example, unique resources included in the schedules or a quantity of time for resources included in the schedules.

In some implementations, it may be desirable to monitor the delivery partner data store 170 to identify updates in the behavior or partners included therein. In such instances, upon detecting an update to a behavior or available partners, the scheduling server 120 may request updated offer prediction information for the available partners and generate a new schedule. If the new schedule differs from the original schedule or the difference is above a threshold, the scheduling server 120 may initiate transmission of a message to the planning device 110 that received the original schedule. For example, the original schedule may be stored by the scheduling server 120 along with contact information for the planning device 110 (or user associated therewith). Using stored contact information stored, the scheduling server 120 may transmit a message including the updated estimate to the planning device 110. The difference between two schedules may be measured by, for example, unique resources included in the schedules or a quantity of time for resources included in the schedules.

The user interface presenting the schedule on planning device 110 may include an option to edit or authorize the schedule. If the schedule is edited, the changes may be transmitted to the scheduling server 120. The scheduling server 120 may then store the edited schedule in a data store. If the schedule is authorized, a schedule communications server 190 may transmit the time and day offers for a delivery partner 195 to a device associated with the delivery partner 195. Transmission of an offer may include information for accepting an offer, deadline for accepting the offer, or incentives associated with the offer.

Because the scheduling server 120 generated the schedule with an appreciation for the specific delivery partners and the likelihood that an offer would be accepted, a quantity of resources needed to communicate the offers to the delivery partners may be substantially reduced as compared to the resources needed to communicate a schedule that treats delivery partners as fungible resources.

Figure 2:
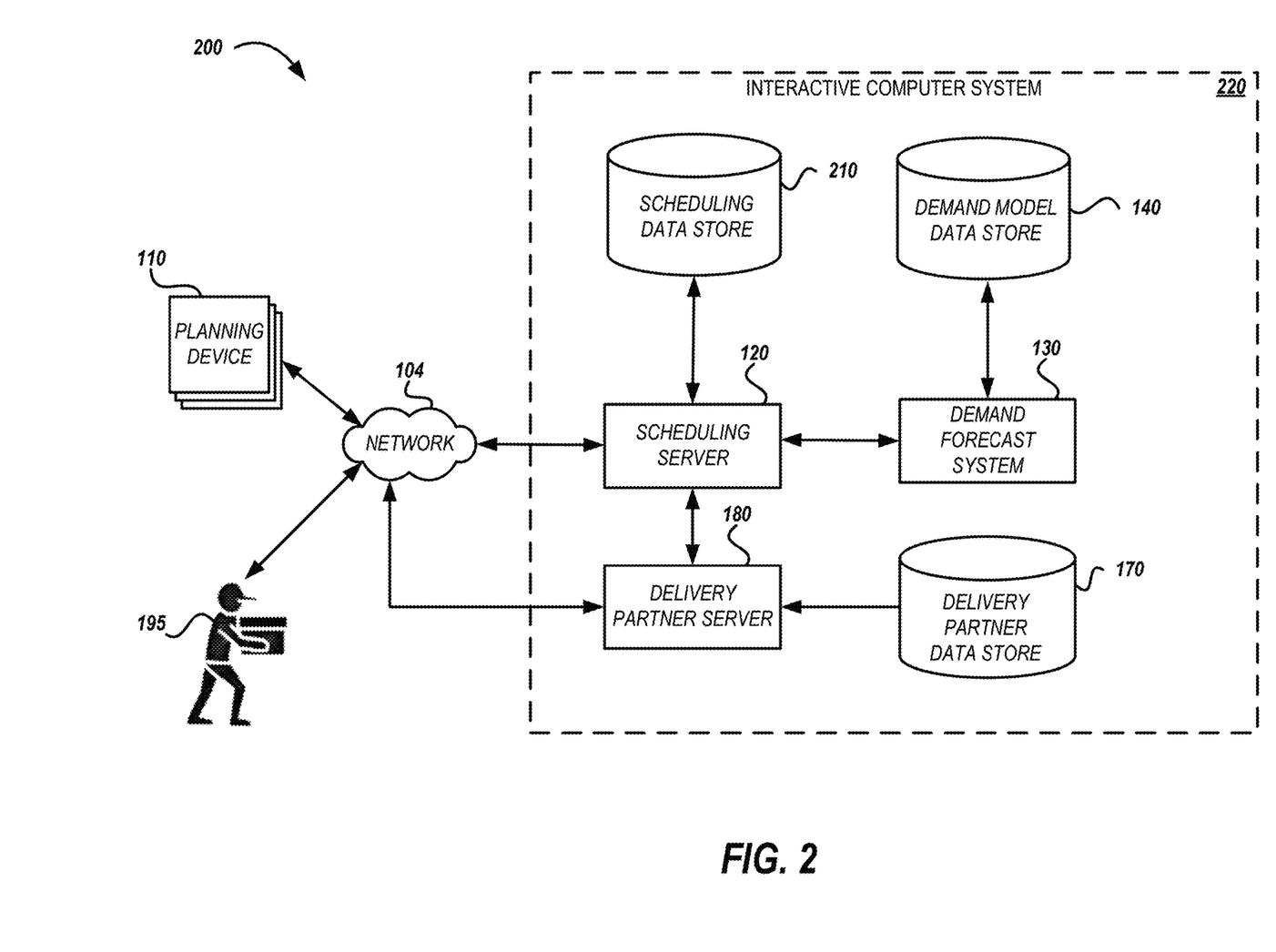
FIG. 2 is a block diagram depicting an illustrative operating environment for generating schedules.

FIG. 2 is a block diagram depicting an illustrative operating environment for generating schedules. In the environment 200 shown in FIG. 2, a user of the environment 200 may access the planning device 110 to communicate with the scheduling server 120 via a communication network 104. The planning device 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, glasses or other wearable devices, or any other device with a hardware processor.

The network 104 may be any wired network, wireless network, or combination thereof. In addition, the network 104 may be a personal area network, local area network, wide area network, cable network, satellite network, cellular telephone network, etc. or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or some other type of wireless network. The network 104 may use protocols and components for communicating via the Internet or any of the other aforementioned types of networks.

The planning device 110 may present a scheduling interface that includes control elements to receive data inputs for generating, editing, and authorizing a schedule. Example data inputs may include a scheduling request such as the scheduling request 102 shown in FIG. 1. The user interface may include a control element that, when activated, causes submission of a message requesting schedule to the scheduling server 120. The request may include a value indicating whether the request is a one-time request or an ongoing request (e.g., subscription) for schedules. If the request is for a one-time schedule, the scheduling server 120 may generate the schedule as discussed with reference to FIG. 1 and in further detail below. The generated scheduled may then be returned as a response to the request to the planning device 110. If the request is for ongoing schedules, the scheduling server 120 may save information identifying the planning device 110 and/or user requesting the schedule. As schedules are generated, the scheduling server 120 may transmit the schedule to the planning device 110 or another device associated with the user requesting the schedule. In this way, the planning device 110 may subscribe to real-time updates for schedules based on the most recent models and inputs (e.g., delivery partner availability, incentives, delivery demand, etc.).

The requests received by the scheduling server 120 and/or the schedules provided may be stored in a scheduling data store 210. The scheduling data store 210 may be a specially architected memory device configured to store generated schedules. The information may be indexed by one or more of: an identifier of the planning device (e.g., IP address, media access control (MAC) address, mobile equipment identifier (MEID), etc.), an identifier of the planning region, a user identifier (e.g., user name, user ID, etc.) associated with the request for the schedule, or an identifier for the planning window. The scheduling data store 210 may store a generation date associated with a schedule. The generation date may indicate when the schedule was generated. The generation date may be used to identify when subsequent processing to generate additional schedules should occur. For example, the scheduling server 120 may include a threshold indicating how often the scheduling server 120 should determine if new demand models or delivery partners are available. If the amount of time elapsed since the generation date exceeds the threshold, the scheduling server 120 may initiate generation of a revised schedule.

Whether generating a new schedule or revising a schedule, the scheduling server 120 may communicate with the demand forecast system 130 to obtain one or more demand forecast scenarios. The demand model data store 140 may be included to store the trained forecast models as discussed with reference to FIG. 1.

The delivery partner server 180 may provide information about delivery partners to the scheduling server 120. The information may include delivery partners available within a region. The information may include delivery partners available for a specified period of time. The information may include offer probability information for the delivery partner indicating the likelihood an offer will be accepted for a particular day or timeslot. The likelihood may also include information about a transmission mode most likely to solicit a positive response (e.g., email message, text message, telephone call, etc.). The transmission mode may include the medium used to transmit the message or the formatting of the message (e.g., message type, font, imagery, etc.). The information may include information to transmit the message such as a phone number or email address for the delivery partner. The information may be retrieved from the delivery partner data store 170.

The delivery partner 195 may also provide responses to offers for deliveries. One response may be accepting or declining an offer. One response may include setting vacation settings for a period of time when the delivery partner 195 is not available for responding to an offer. One response may include delivery activity for a scheduled task. The delivery activity may include a message indicating the start of a delivery shift, the end of a delivery shift, completion of a task during a delivery shift, or the like. The delivery activity may be stored in the delivery partner data store 170 and used to generate updated offer probability information for the delivery partner 195 as described.

The environment 200 is depicted in FIG. 2 as a distributed computing environment including several computer systems that are interconnected using one or more computer networks. The interactive computer system 112 could also operate within a computing environment having a fewer or greater number of devices than are illustrated in FIG. 2. Thus, the depiction of interactive computer system 112 in FIG. 2 should be taken as illustrative and not limiting to the present disclosure. For example, the interactive computer system 112 could implement various Web service components and/or peer to peer network configurations to implement at least a portion of the processes described herein.

Figure 3:
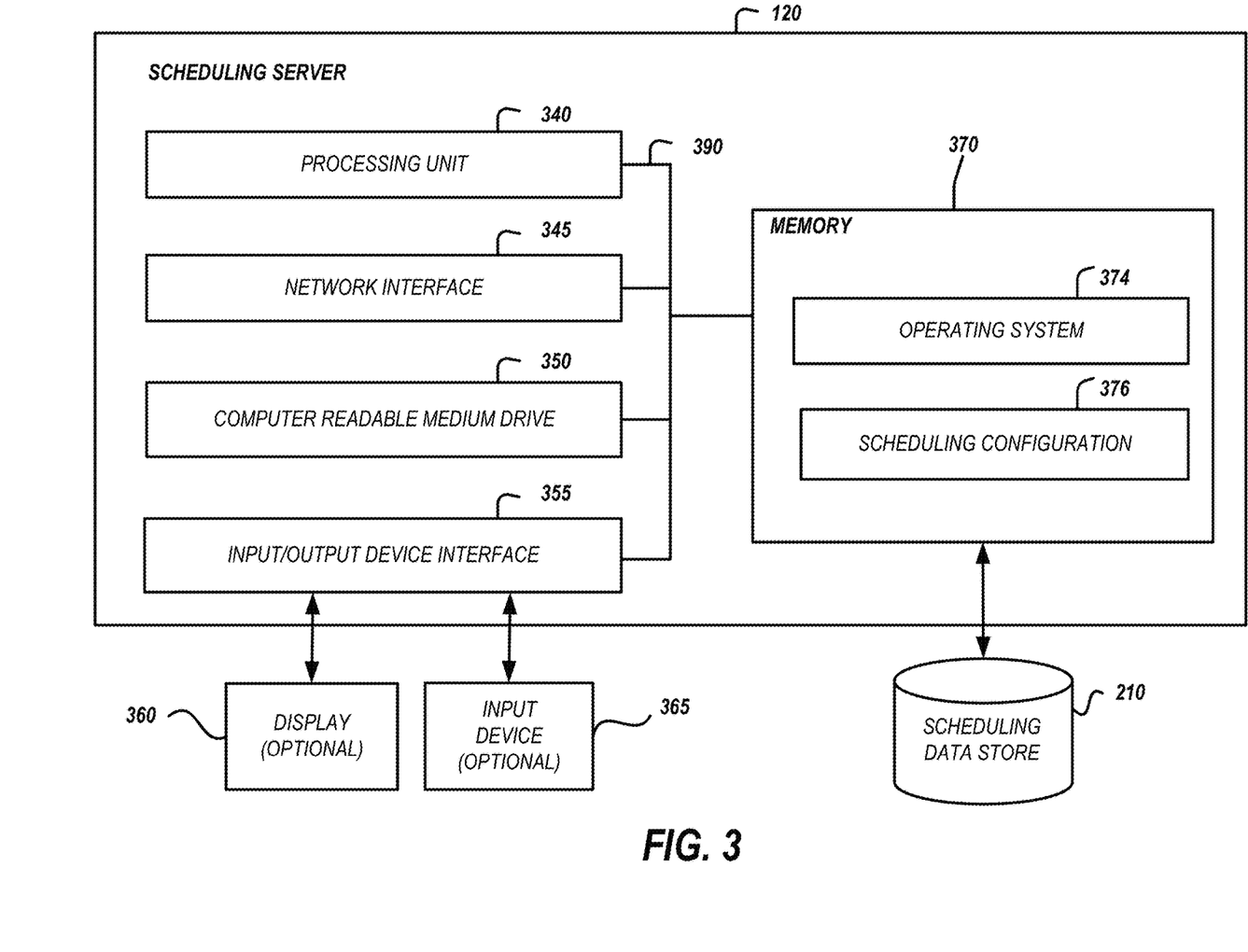
FIG. 3 is a block diagram depicting an illustrative architecture for a computing device providing scheduling services.

FIG. 3 is a block diagram depicting an illustrative architecture for a computing device providing scheduling services. The scheduling server 120 can be a server or other computing device, and can comprise a processing unit 340, a network interface 345, a computer readable medium drive 350, an input/output device interface 355, and a memory 370. The network interface 355 can provide connectivity to one or more networks or computing systems such as the network 104 shown in FIG. 2. The processing unit 340 can receive information and instructions from other computing systems or services via the network interface 345. The network interface 345 can also store data directly to memory 370. The processing unit 340 can communicate to and from memory 370 and output information to an optional display 360 via the input/output device interface 355. The input/output device interface 355 can also accept input from the optional input device 365, such as a keyboard, mouse, digital pen, microphone, mass storage device, etc.

The memory 370 generally includes RAM, ROM, and/or other persistent, non-transitory computer readable media. The memory 370 can store an operating system 374 that provides computer program instructions for use by the processing unit 340 or other elements included in the computing device in the general administration and operation of the scheduling server 120. The memory 370 can further include computer program instructions and other information for implementing aspects of the present disclosure.

For example, in one embodiment, the memory 370 includes a scheduling configuration 376. The scheduling configuration 376 may include thresholds or predetermined values to support the scheduling operations, such as generating a schedule for on-demand resources within a region for a given period of time, described herein. The scheduling configuration 376 may store specific values for a given configuration. For example, the threshold for determining when to check for new forecast models or delivery partners may be specified as an absolute value (e.g., every day, week, 10 days, etc.). The values may be provided in a look up table indexed by, for example, a region to which the values apply. For example, a region may limit the number of consecutive days a delivery partner may work. This constraint on schedules generated by the system can be identified in the look up table indexed by region.

Rather than storing express values for a particular configuration element, the scheduling configuration 376 may, in some implementations, store information that allows the scheduling server 120 to obtain a dynamically generated value for the given configuration element. For example, the identity of the default demand forecast system may be specified as a network location (e.g., URL) in conjunction with username and password information to access the network location to obtain the default demand forecast system that should be used by the scheduling server 120.

The memory 370 may also include or communicate with one or more auxiliary data stores, such as the scheduling data store 210. The scheduling data store 210 may electronically store data regarding schedules generated by the scheduling server 120, planning devices to notify in the event of a revised schedule, and the like.

The elements included in the scheduling server 120 may be coupled by a bus 390. The bus 390 may be a data bus, communication bus, or other bus mechanism to enable the various components of the scheduling server 120 to exchange information.

In some embodiments, the scheduling server 120 may include additional or fewer components than are shown in FIG. 3. For example, a scheduling server may include more than one processing unit 340 and/or computer readable medium drive 350. In another example, the scheduling server 120 may not be coupled to a display (e.g., the display 360) or an input device (e.g., the input device 365). In some embodiments, two or more scheduling servers may together form a computer system for executing features of the present disclosure.

Figure 4A:
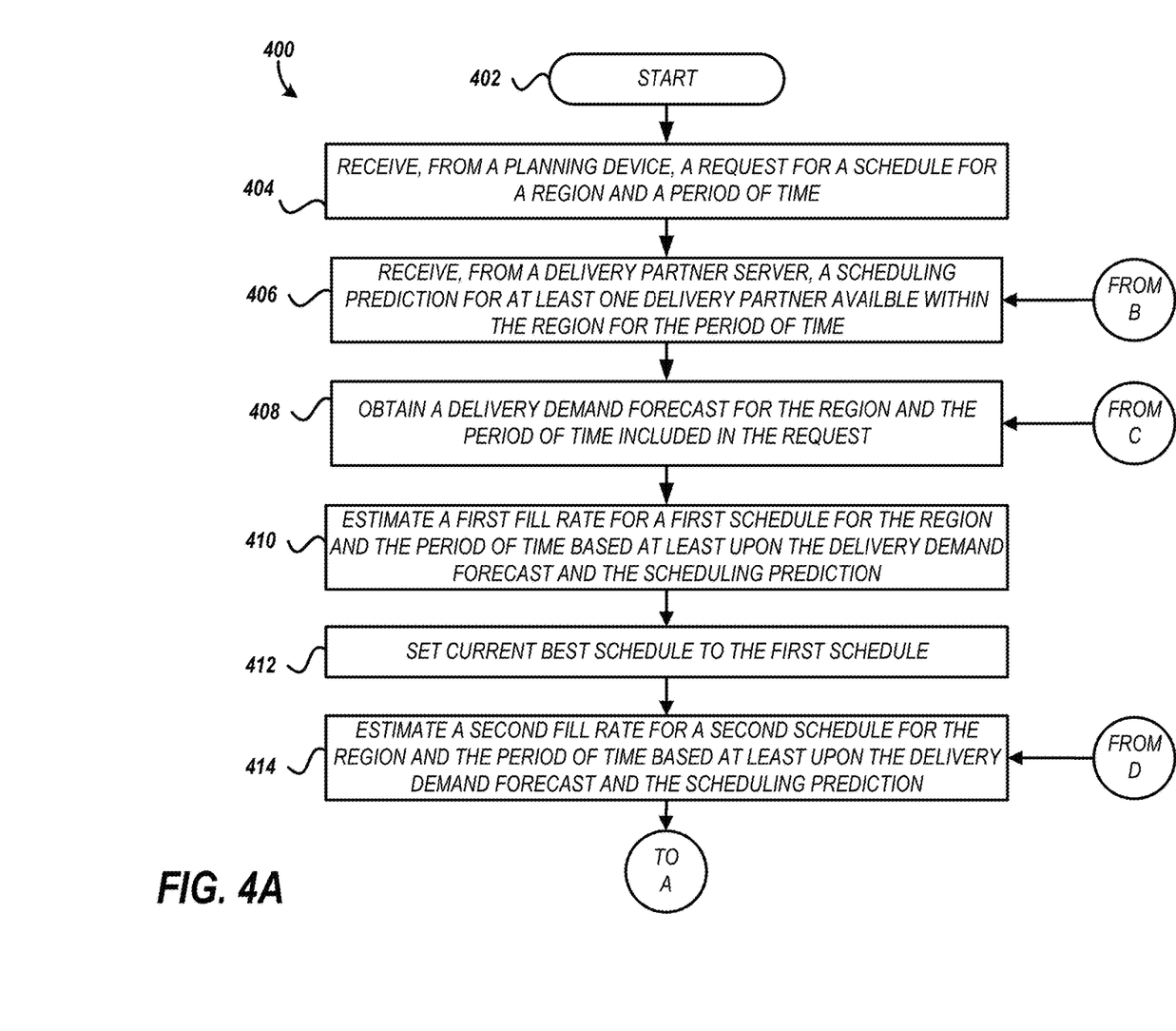
FIGS. 4A and 4B are a flow diagram depicting an illustrative method of generating a schedule for on-demand resources.
Figure 4B:
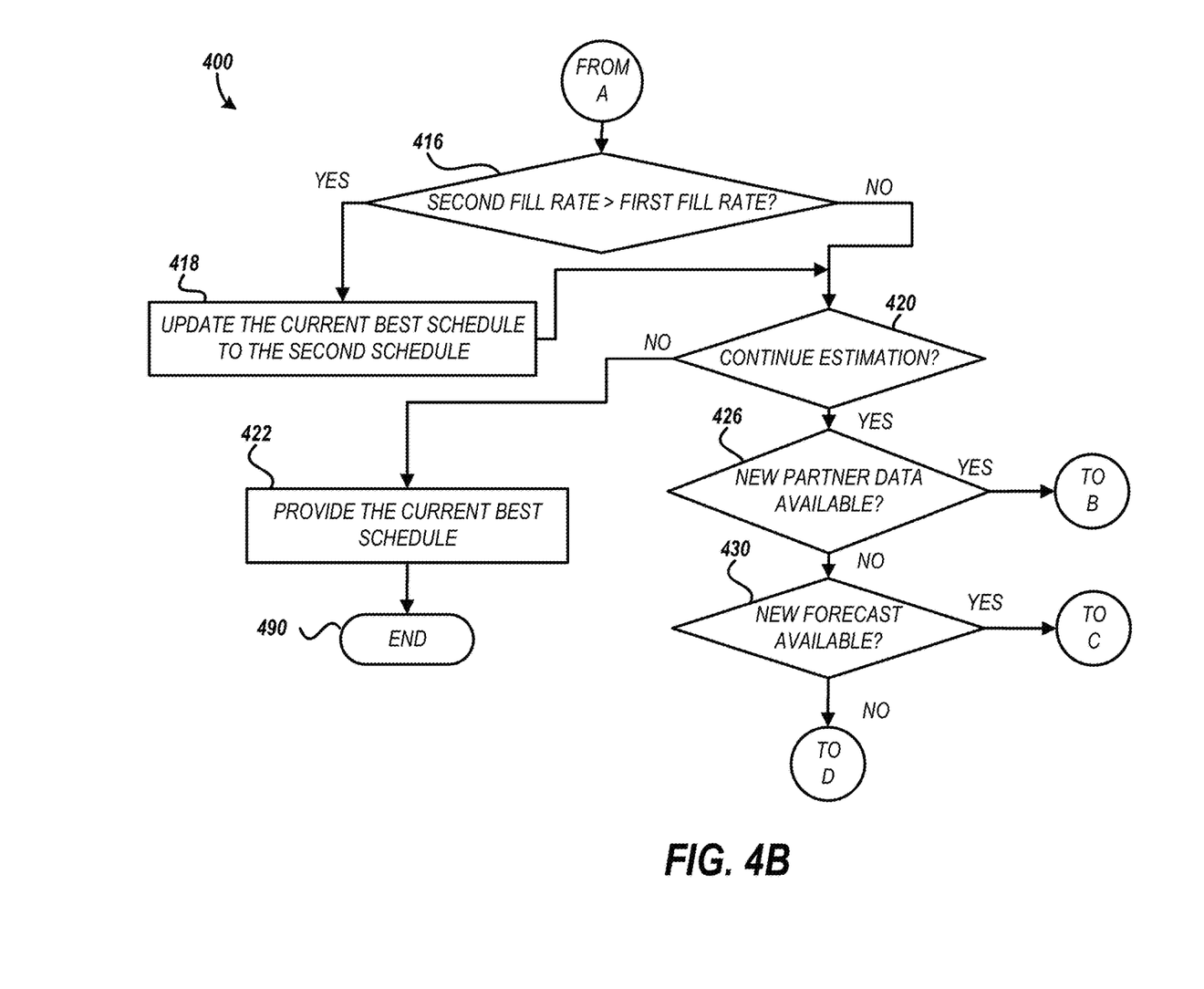

FIGS. 4A and 4B are a flow diagram depicting an illustrative method of generating a schedule for on-demand resources. The method 400 may be implemented in whole or in part by one or more of the devices described herein, such as the scheduling server 120 shown in FIG. 1, FIG. 2, or FIG. 3. The method 400 demonstrates one way the scheduling server 120 may efficiently identify and organize on-demand resources, such as delivery partners, into a schedule. The schedule generated by the method 400 generally exceeds the fill rate of schedules generated by other methods. The fill rate is the likelihood that a scheduled resource will accept the scheduled tasks and fulfill the tasks associated with the accepted offers.

The method 400 begins at block 402. At block 404, a scheduling server may receive a message requesting a schedule. The message may be received from a planning device such as the planning device 110 shown in FIG. 1. The request may include information identifying a planning region and a planning timeframe (e.g., a window). The request may include offer incentives, demand scenario parameters (e.g., average weather, maximum number of deliveries, etc.), or scheduling limitations (e.g., number of consecutive days for a delivery partner, maximum shift length, maximum work time for the window, quantity of time or resources (e.g., memory, processor cycles, power) to use for generating the schedule).

At block 406, the scheduling server may receive, from a resource information server such as the delivery partner server 180 shown in FIG. 1, a scheduling prediction for at least one delivery partner available within the region and timeframe identified in the message received at block 402. The scheduling prediction may include offer prediction information for a delivery partner similar to that shown in Table 1. In some implementations, the At block 408, the scheduling server may obtain a first demand forecast for the provider (e.g., the entity performing the planning to identify an inventory quantity). The demand forecasts may be obtained based on at least one of the region or the timeframe. In some implementations, the demand forecast may be based on a parameter detected by or via the scheduling server such as predicted weather conditions, user demographics, date/time information, or user activities on a catalog system.

A demand forecast may identify, for a set of parameters, a quantity of delivery resources that may be needed for the specified time or place to complete an expected quantity of tasks. In some implementations, the demand forecast may include a probability indicating a confidence in the quantity. If the probability is low, then the confidence that the quantity forecast will be the actual demand is less likely than for a forecast with a high probability of occurring. The scheduling server may obtain the demand forecast from a demand forecast system such as the demand forecast system 130 discussed above.

In FIG. 4, one demand forecast is obtained. However, it will be appreciated that multiple demand scenarios may exist. A demand scenario generally refers to a set of parameters and the demand model used to generate a demand forecast. For example, one demand scenario for delivery to a specified area may include the detectable parameter of 1 to 5 inches of snow while a second demand scenario may be based on 0 inches of snow. The delivery demand in each scenario would likely be different to account for the severe weather in the first scenario as compared to the more mild weather in the second scenario. The scenarios or selections of parameters for identifying specific scenarios may be identified in the message received at block 404.

At block 410, the scheduling server may estimate a first fill rate for a first schedule for the region and period of time. The fill rate may be a measure of how much of the delivery demand is predicted to be satisfied by the first schedule. The first schedule may be generated based on the forecasted demand and the scheduling predictions for the available delivery partners in the region.

The schedule generated at block 410 may be generated based on the information included or identified by the message received at block 404. The fill rate may also be estimated using the demand forecasts obtained at block 408. The scheduling server may include a memory location for storing a reference to the schedule which provides the highest fill rate. The highest fill rate schedule may be identified as the "best" schedule. At block 412, the scheduling server may set the current best schedule to the first schedule. The scheduling server may set the best schedule by storing information identifying the first schedule in the memory location reserved for the current best schedule. In some implementations, the scheduling server may reserve a location for the "best" schedule for each request. In this way, the scheduling server may process multiple scheduling requests concurrently.

At block 414, the scheduling server may estimate a second fill rate for a second schedule for the region and period of time. This is similar to the first fill rate at block 410, but for a different schedule. The second schedule may be determined based on the first schedule. For example, the second schedule may identify a portion of the lowest offer probability delivery partners included in the first schedule and replace the slots in the first schedule for these delivery partners to alternate delivery partners. The portion (e.g., bottom 10%, bottom 5%, or other) may be stored in a configuration file accessible by the scheduling server. This affords an incremental comparison for different schedules. The fill rates may be compared to suggest which schedule satisfies the highest amount of expected demand.

Continuing to FIG. 4B, at block 416, the scheduling server may determine whether the second fill rate is greater than the first fill rate. If the determination at block 416 is affirmative, the method 400 may proceed to block 418. At block 418, the scheduling server may set the current best schedule to the second schedule. Because the second schedule produced a greater expected fill rate, the second schedule may be considered the current "best" schedule. However, the scheduling server may estimate fill rates for additional schedules to determine whether a better solution exists (e.g., one with a higher fill rate). In some implementations, it may be desirable to compare 50, 100, 1000, or more different schedules for a demand scenario.

At block 420, the scheduling server may determine whether to continue estimating. The determination at block 420 may be based on one or more of the probability of the demand forecast model used to generate the fill rate, a difference between the fill rate for the current "best" schedule and the fill rate for the second best schedule, a total number of schedules generated as compared to a threshold number of schedules to analyze, elapsed time or other resources used for generating schedules, size of a queue of pending schedule requests (e.g., if no requests are pending), or the like. In some implementations, a metric may be generated for a schedule identifying the cost or benefit level for the schedule. In such implementations, the determination at block 420 may be based in whole or in part on one or more of the metrics. For example, a threshold cost for a schedule may be defined in the scheduling configuration or as a parameter in the scheduling request. If the current "best" schedule exceeds the threshold cost, the determination at block 420 may be affirmative to continue searching for a schedule that meets the expected cost.

If the determination at block 420 is negative, estimation may terminate and the method 400 may proceed to block 422. At block 422, the scheduling server may provide the current best schedule such that it can be accessed by a planning device. Providing the current best schedule can include storing the schedule in a scheduling data store such as the scheduling data store 210. Providing the schedule may include transmitting a message to the planning device that requested the schedule. In some implementations, the schedule or offers included therein may be directly transmitted to the delivery partners included in the schedule. In this way, the schedule can be communicated in real-time to keep all parties informed as to the capacity needs.

As discussed above, there may be multiple demand scenarios. In such instances, providing the schedule may include providing the associated demand scenario used to generate the schedule. In implementations where multiple demand scenarios are identified, it may be desirable to provide the best schedule for each scenario. A user of the planning device may authorize one of the schedules for communication to the delivery partners in the authorized schedule.

Returning to decision block 420, if the scheduling server determines that estimation should continue, the method 400 may proceed to block 426. At block 426, the scheduling server may determine whether new partner data is available. The determination may be based on a change in a detectable parameter (e.g., delivery results for partners, acceptance/rejection of offers by partners, or addition/removal of partners) within the region. The determination may be based on a change in machine learning models or other assessment tools used to identify delivery partners. For example, if a model was used to generate offer prediction information for a delivery partner, the retrained model may be associated with information (e.g., date, hash, identifier, version number) indicating the update. The scheduling server may compare the information for the model stored when the schedule was generated with the information associated with the updated model. Based on the comparison, the scheduling server may determine whether a new model is available. As another example, if the delivery partner data store includes a static listing of delivery partners, the determination may include identifying changes to records for delivery partners associated with the region. Changes may be identified based on a count of delivery partners or timestamp information identifying when a record was updated. If the update date is a time after the time the schedule was generated, newer delivery partner information may be available for consideration.

If the determination at block 426 is affirmative, the method 400 may return to block 406 in FIG. 4A to identify available at least one delivery partner as described. If the determination at block 426 is negative (e.g., no new delivery partners or delivery partner information), the method 400 may proceed to at block 430.

At block 430, the scheduling server may determine whether new demand forecasts are available. The determination may be based on a change in a detectable parameter used for forecasting. The determination may be based on a change in the machine learning models. For example, if a model that was used to generate a schedule is retrained to account for new training data, the retrained model may be associated with information (e.g., date, hash, identifier, version number) indicating the update. The scheduling server may compare the information for the model stored when the schedule was generated with the information associated with the updated model. Based on the comparison, the scheduling server may determine whether a new model is available.

The determination may include monitoring the demand forecast system and/or data source for a detectable parameter. The scheduling system may store information identifying the specific model and parameters being used and, if a change is detected, return to block 408 of FIG. 4A to obtain a new demand forecast. If the determination at block 430 is negative, then the previously obtained demand forecast may be used to continue generating schedules for estimating fill rates. In such instances, the method 400 may return to block 414 of FIG. 4A to generate another estimate for the fill rate for another schedule as described above.

Returning to block 416, if the second fill rate is not greater than the first fill rate, then the first schedule is the current "best" schedule for maximizing the expected fill rate. The method 400 may continue to block 420 as described above to determine whether to generate additional estimates/schedules or to finish the process.

The method 400 ends at block 490. However, the method 400 may be repeated for additional or alternate items, in the case where new demand models are available to re-evaluate the schedule provided, or in the case where the initial request for the schedule indicates ongoing (e.g., subscription) scheduling.

In some implementations, an optimizer may be included and configured to generate the schedules. The optimizer may select the delivery partners and evaluate the fill rate for the schedule based at least in part on the offer prediction information for the delivery partners included in the schedule. The optimizer may be configured to determine whether to continue evaluating schedules or if a suitable schedule is obtained. The optimizer may be implemented as part of the scheduling server or as a component in data communication with the scheduling server.

The various features included in scheduling based on information for specific delivery partners included in the schedule may be embodied as a model. Such a model may generate a value for an expected metric such as cost. Cost may be measured as time, resources, distance, processor cycles, power consumption, network hops, throughput, bandwidth, or other network or resource property measurable for tasks included in a schedule. The model may include coefficients for different parameters which affect the cost for a given schedule. Table 2 provides some example parameters which may be included within the model.

TABLE 2

| Parameter | Description |
| --- | --- |
| Provider demand underage | The number of units of delivery demand not filled. Cost coefficient is cost per demand not met. |
| Deviation from weekly work minutes | Each delivery partner has a target number of minutes to work weekly. An increasing per minute cost is applied for each minute above target. A fixed cost per minute is applied for each minute below target. |
| Deviation from target work block size | Each scheduled block length has a target fraction of total blocks offered. A cost per block is incurred for each block over or under the target number of blocks expected by the target fraction. |
| Weeks since partner on-boarding | Cost reduction per week for giving a new delivery partner work within the first week of onboarding. |
| Days since last partner offer | Cost reduction per day for giving a delivery partner work since the last day they worked. |

A schedule may also be subject to one or more constraints. The constraints may be identified in the scheduling request or through a scheduling configuration for the system or for the region. Examples of constraints that may be included are: the number of offers cannot, if accepted, exceed the expected demand; delivery partners can work a predetermined number of hours per day, week, or month; a delivery partner can be offered a single continuous block of work consisting of a minimum quantity of deliveries within the block; a delivery partner can work a maximum number of consecutive days.

To generate the offer prediction information for a delivery partner, a discrete choice model may be used. Discrete choice models attempt to analyze a decision maker's preferences amongst alternatives. Let the set $\{1, 2, 3, \ldots, n\}$ be the choices of offers a delivery partner can choose from with each number representing a kind of offer with certain attributes. For example, 1 may refer to the Monday morning exclusive offer while 2 refers to the Tuesday afternoon nonexclusive offer. It can be assumed that the probability of a delivery partner (DP) i chooses a particular offer j is a function of observed attributes related to the delivery partner and the offer. One expression of the probability of selecting the offer j is shown in Equation 1.

$$Pr(DP\ i\ chooses\ offer\ j) = f(A_i, x_{ij}, \beta) \quad \text{Equation (1)}$$

where:
- $A_i$ is a vector of attributes (e.g., tenure, historical behavioral response) of delivery partner i;
- $x_{ij}$ is a vector of attributes of offer j faced by driver i; and
- $\beta$ is a set of parameters giving the effects of variables on the probabilities that are estimated statistically.

The problem may be represented as a multiclass classification where the prediction problem is to accurately classify an offer j chosen by driver i with the implicit assumption that offer j is preferred to all the other offers j. Two broad categories of techniques may be used to identify a functional form f and estimate the parameters $\beta$.

One technique is multinomial logit models. This category model may be derived from "utility theory" where it is assumed that delivery partner i obtains "utility" $U_{ik}$ by choosing offer k. Delivery partner i may choose offer j in the historical data if $U_{ij} \geq U_{ik}$ for any $k \neq j$. That is, the delivery partner would derive higher utility from offer j than any other alternative offers. It may be further assumed that the utility function has a linear form, that is, $U_{ij} = \alpha A_i + \beta x_{ij} + \varepsilon_{ij}$ with $\varepsilon_{ij}$ being the random error. With this assumption, the probability may be expressed as shown in Equation 2.

$$Pr(DP\ chooses\ offer\ j) = \exp(\alpha A_i + \beta x_{ij})/\Sigma_k \exp(\alpha A_i + \beta x_{ik}) \quad \text{Equation (2)}$$

Another technique may be machine learning models for multiclass classification problem, such as random forest models. For example, a "one-vs-rest" batch learning technique may be provided that involves training a predictor per type of the accepted offer, with the observations of such accepted offer as positive class and all other offer-action combination as negatives. One example training algorithm may constructed from a binary classification learner L as follows:

Inputs:
L, a learner for binary (0-1) classes, e.g., random forest
Input data X which includes delivery partners and offer attributes
Labels $\{0,1,2,3, \ldots, n\}$ where 0 represents that the delivery partner does not take any offer and a positive number represents that the delivery partner accepts an offer with certain attributes Procedure:
1. For each k in $\{0,1,2,3, \ldots, n\}$, construct a new label z such that $z_i = 1$ if the original label is k and $z_i = 0$ otherwise.
2. Apply binary classifier L to input data X and new label z to obtain predicted probability for each class k.

Figure 5:
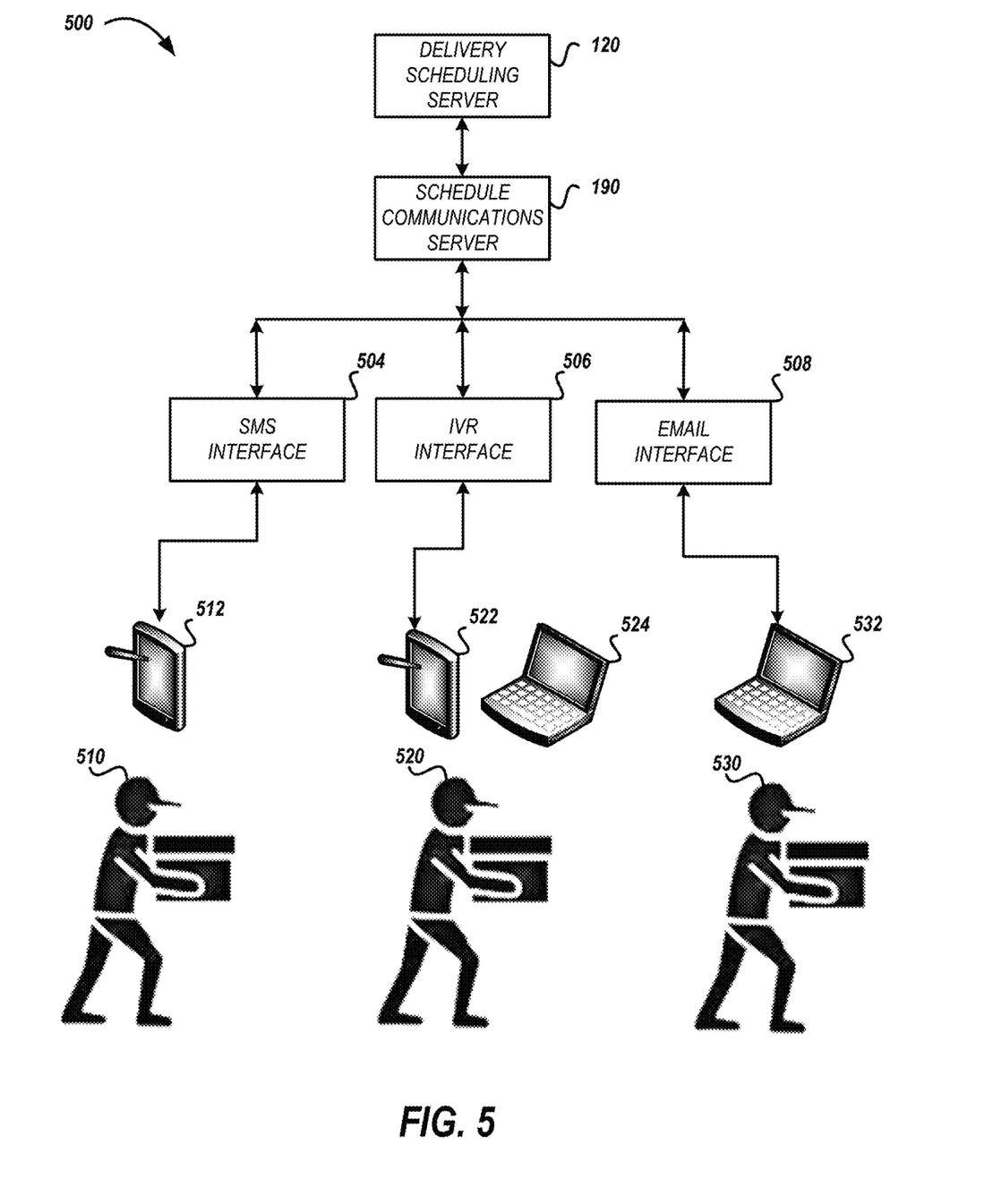
FIG. 5 is a pictorial diagram depicting schedule offer routing to various delivery partner devices.

FIG. 5 is a pictorial diagram depicting an environment for schedule offer routing to various delivery partner devices. A schedule may be authorized for distribution to delivery partners. The schedule may include transmission information indicating, for each delivery partner, the transmission mode to use for communicating the offer that is most likely to illicit acceptance of the offer.

The scheduling server 120 may transmit the authorized schedule to the schedule communications server 190. The schedule communications server 190 may then identify which of a plurality of communication interfaces to use to communicate a schedule offer to a delivery partner. For example, a first delivery partner 510 may only be associated with a mobile communication device 512 which may receive email messages or short message service (SMS) messages (e.g., text messages). Based on historic behavior information for the first delivery partner 510, it may be determined that SMS messaging may be the ideal way to solicit the first delivery partner 510. The environment 500 may include an SMS interface 504 that can receive the offer for the first delivery partner 510 and communicate the offer via SMS message to the mobile communication device 512. The SMS interface 504 may be further configured to receive a response from the mobile communication device 512 accepting or rejecting the offer.

A second delivery partner 520 may be associated with a mobile communication device 522 and another communication device 524. The mobile communication device 522 may receive telephone calls, email messages, or short message service (SMS) messages (e.g., text messages). Again, based on historic behavior information for the second delivery partner 520, it may be determined that the ideal way to solicit the second delivery partner 520 is through telephone calls. The environment 500 may include an interactive voice recognition (IVR) interface 506 that can receive the offer for the second delivery partner 520 and communicate the offer via a telephone call to the mobile communication device 522. The IVR interface 506 may be further configured to receive a response from the mobile communication device 522 accepting or rejecting the offer.

A third delivery partner 530 may be associated with a communication device 532. The communication device 532 may receive email messages. Based on historic behavior information for the third delivery partner 530, it may be determined that the ideal way to solicit the third delivery partner 530 is through email messages. The environment 500 may include an email interface 508 that can receive the offer for the third delivery partner 530 and communicate the offer via an email message to the communication device 532. The email interface 508 may be further configured to receive a response from the communication device 532 (e.g., email message response) accepting or rejecting the offer.

Various features for scheduling on-demand resources have been described. The features may be implemented via a scheduling system. The scheduling system may include one or more computer processors and a memory device configured to store instructions that can be executed by the one or more computer processors. When executed, the instructions cause the system to perform at least a portion of the scheduling features described. For example, the instructions may cause the system to generate a probabilistic scorecard for a delivery partner, the probabilistic scorecard indicating for a timeslot on a given weekday, a probability that the delivery partner will successfully complete a delivery. The probabilistic scorecard may be generated by machine learning model trained on historical behavior data for the delivery partner. The historical behavior data may indicate: offers presented to the delivery partner, a response by the delivery partner to offers, and a fulfillment rate of accepted offers by the delivery partner. The instructions may cause the system to receive a request for a schedule for deliveries over a period of time and receive a model for generating an offer for the delivery partner to satisfy at least a portion of the deliveries. The model may receive information describing the deliveries (e.g., identifiers for the deliveries, number of deliveries, location of deliveries, time of day for making delivery, etc.), the period of time, available delivery partner information (e.g., partner identifier, enrolled programs, task history, etc.), and probabilistic scorecards for each of the available delivery partners as inputs. The schedule generated by the model may include offers predicted to satisfy a threshold number of the deliveries for the period of time using at least a portion of the delivery partners. The instructions may cause the system to identify the available delivery partners based at least in part on the request for delivery service. The available delivery partners may include the delivery partner. The instructions may cause the system to generate the schedule using the model and the probabilistic scorecard for the delivery partner, wherein the schedule includes the offer for the delivery partner and transmit the offer to a communication device associated with the delivery partner.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a scheduling server, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A scheduling server can be or include a microprocessor, but in the alternative, the scheduling server can be or include a controller, microcontroller, or state machine, combinations of the same, or the like configured to estimate and communicate scheduling information. A scheduling server can include electrical circuitry configured to process computer-executable instructions. Although described herein primarily with respect to digital technology, a scheduling server may also include primarily analog components. For example, some or all of the scheduling algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a scheduling server, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the scheduling server such that the scheduling server can read information from, and write information to, the storage medium. In the alternative, the storage medium can be integral to the scheduling server. The scheduling server and the storage medium can reside in an ASIC. The ASIC can reside in a user terminal. In the alternative, the scheduling server and the storage medium can reside as discrete components in a user terminal (e.g., planning device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising,
under control of one or more processors,
for each delivery partner of a plurality of delivery partners,
generating, using a first machine learning model, a probabilistic scorecard for the delivery partner, the probabilistic scorecard indicating for a timeslot on a given weekday, a probability that the delivery partner will successfully complete a delivery,
wherein the first machine learning model is trained on historical behavior data for the delivery partner, and
wherein the historical behavior data indicates:
(i) offers presented to the delivery partner,
(ii) a response by the delivery partner to offers, and
(iii) a fulfillment rate of accepted offers by the delivery partner;
receiving a request, from a planning device, for a schedule for deliveries in a region over a period of time;
identifying available delivery partners from the plurality of delivery partners based at least in part on the request for the schedule for deliveries, wherein the available delivery partners include a first delivery partner;
obtaining, from an electronic memory using an index associated with the region, a scheduling configuration for the region;
obtaining, from the scheduling configuration for the region, a uniform resource identifier, the uniform resource identifier identifying a network location of a second machine learning model appropriate for generating the schedule, wherein the network location of the second machine learning model is subject to change;
obtaining, from the network location, the second machine learning model;
generating, using the second machine learning model, the schedule for deliveries over the period of time;
wherein input to the second machine learning model comprises information describing the deliveries, the period of time, delivery partner information for each of the available delivery partners, and the probabilistic scorecard for each of the available delivery partners,
wherein output from the second machine learning model comprises the schedule for deliveries over the period of time, and
wherein:
the schedule includes offers to satisfy the deliveries,
the offers in the schedule include an offer for the first delivery partner to satisfy at least a portion of the deliveries, and
the offers in the schedule are predicted to satisfy a threshold number of the deliveries for the period of time using at least a portion of the available delivery partners; and
transmitting the schedule to the planning device.

2. The computer-implemented method of claim 1, wherein the computer-implemented method further comprises:
receiving a scheduling constraint for the region, wherein the scheduling constraint identifies a total number of minutes the first delivery partner can work during the period or a number of consecutive days the first delivery partner can work during the period; and
determining that the schedule conforms to the scheduling constraint for the first delivery partner.

3. The computer-implemented method of claim 1,
wherein the schedule includes offer transmission information for the first delivery partner, the offer transmission information identifying a message type associated with a highest probability of soliciting a response from the first delivery partner for an offer to the first delivery partner, wherein the computer-implemented method further comprises:
transmitting the offer to a communication device associated with the first delivery partner, wherein transmitting the offer to the communication device comprises:
generating a message of the message type based at least in part on the offer; and
transmitting the message to the communication device based at least in part on the offer transmission information.

4. The computer implemented method of claim 1, further comprising:
estimating a first fill rate for the schedule generated by the second machine learning model, wherein the first fill rate represents a likelihood that the schedule generated by the second machine learning model will satisfy a demand for the deliveries over the period of time;
estimating a second fill rate for a second schedule different than the schedule generated by the second machine learning model, wherein the second fill rate represents a likelihood that the second schedule will satisfy a demand for the deliveries over the period of time; and
determining that the first fill rate exceeds the second fill rate.

5. A computer-implemented method comprising,
under control of one or more processors,
for each task resource of a plurality of task resources,
generating, using a first machine learning model, offer probability information for the task resource, the offer probability information indicating for a timeslot on a given day of a week, a probability that the task resource will successfully complete a task,
wherein the first machine learning model is trained on historical behavior data for the task resource, and
wherein the historical behavior data indicates:
(i) offers presented to the task resource,
(ii) a response by the task resource to offers, and
(iii) a fulfillment rate of accepted offers by the task resource;
receiving a request, from a planning device for a schedule for tasks in a region for a period of time;
identifying available task resources from the plurality of task resources based at least in part on the request for the schedule for tasks, wherein the available task resources include a first task resource;
obtaining, from an electronic memory using an index associated with the region, a scheduling configuration for the region;
obtaining, from the scheduling configuration for the region, a uniform resource identifier, the uniform resource identifier identifying a network location of a second machine learning model appropriate for generating the schedule, wherein the network location of the second machine learning model is subject to change;
obtaining from the network location, the second machine learning model;
generating, using the second machine learning model, the schedule for tasks for the period of time;
wherein input to the second machine learning model comprises information associated with the tasks, the period of time, task resource information for each of the available task resources, and the offer probability information for each of the available task resources, wherein output from the second machine learning model comprises the schedule for tasks over the period of time, and wherein:
the schedule includes offers to satisfy the tasks,
the offers in the schedule include an offer for the first task resource to satisfy at least a portion of the tasks, and
the offers in the schedule are predicted to satisfy a threshold number of the tasks for the period of time using at least a portion of the available task resources; and
transmitting the schedule to the planning device.

6. The computer-implemented method of claim 5, further comprising:
transmitting the offer for the first task resource to a communication device associated with the first task resource;
detecting a response to the offer for the first task resource;
retraining the first machine learning model based at least in part on the response; and
generating, by the first machine learning model, updated offer probability information for the first task resource, the offer probability information indicating for a timeslot on a given day of a week, a probability that the first task resource will successfully complete a task.

7. The computer-implemented method of claim 5, wherein the computer-implemented method further comprises:
receiving a scheduling constraint for the region, wherein the scheduling constraint identifies a limitation for the first task resource; and
determining that the schedule conforms to the scheduling constraint for the task resource.

8. The computer-implemented method of claim 7, wherein the limitation comprises at least one of: a number of minutes worked by the first task resource during the period of time, a duration of time the first task resource has been included on one or more schedules, a number of consecutive days worked by the first task resource, or a duration of time since the offer was made to the first task resource.

9. The computer-implemented method of claim 5,
wherein the schedule includes offer transmission information for the first task resource, the offer transmission information identifying a message type associated with a highest probability of soliciting a response from the first task resource for an offer to the first task resource, wherein the computer-implemented method further comprises:
transmitting the offer for the first task resource to a communication device associated with the first task resource, wherein transmitting the offer to the communication device comprises:
generating a message of the message type based at least in part on the offer, and
transmitting the message to the communication device based at least in part on the offer transmission information.

10. The computer-implemented method of claim 5, wherein generating the schedule comprises:
generating a first candidate schedule using the second machine learning model;
generating a second candidate schedule using the second machine learning model, wherein the first candidate schedule differs from the second candidate schedule;
estimating a first metric value for the first candidate schedule for a schedule metric;
estimating a second metric value for the second candidate schedule for the schedule metric, wherein the schedule metric identifies at least one of a cost or a fill rate for a generated schedule; and
identifying the first candidate schedule as the schedule based at least in part on a comparison between the first metric value and the second metric value.

11. The computer implemented method of claim 10, further comprising:
determining that the first metric value corresponds to a termination threshold, and wherein said identifying the first candidate schedule as the schedule is performed in response to said determining that the first metric value corresponds to the termination threshold.

12. A scheduling system comprising:
a computer-readable memory storing executable instructions; and
one or more computer processors in communication with the computer-readable memory, wherein the one or more computer processors are configured to execute the executable instructions to at least:
for each task resource of a plurality of task resources, generate, using a first machine learning model, offer probability information for the task resource, the offer probability information indicating for a timeslot on a given day of a week, a probability that the task resource will successfully complete a task;
wherein the first machine learning model is trained on historical behavior data for the task resource, and
wherein the historical behavior data indicates:
(i) offers presented to the task resource,
(ii) a response by the task resource to the offer, and
(iii) a fulfillment rate for offers accepted by the task resource;
receive a request, from a planning device, for a schedule for tasks in a region for a period of time;
identify available task resources from the plurality of task resources based at least in part on the request for the schedule for tasks, wherein the available task resources include a first task resource;
obtain, from an electronic memory using an index associated with the region, a scheduling configuration for the region;
obtain, from the scheduling configuration for the region, a uniform resource identifier, the uniform resource identifier identifying a network location of a second machine learning model appropriate for generating the schedule, wherein the network location of the second machine learning model is subject to change;
obtain from the network location, the second machine learning model;

generate, using the second machine learning model, the schedule for tasks for a period of time;
wherein input to the second machine learning model comprises information describing the tasks, the period of time, task resource information for each of the available task resources, and the offer probability information for each of the available task resources, and
wherein output from the second machine learning model comprises the schedule for tasks over the period of time, and
wherein:
the schedule includes offers to satisfy the tasks,
the offers in the schedule include an offer for the first task resource to satisfy at least a portion of the tasks, and
the offers in the schedule are predicted to satisfy a threshold number of the tasks for the period of time using at least a portion of the available task resources; and
transmit the schedule to the planning device.

13. The scheduling system of claim 12,
wherein the one or more computer processors are configured to execute further executable instructions to at least:
transmit the offer for the first task resource to a communication device associated with the first task resource;
detect a response to the offer for the first task resource;
retrain the first machine learning model based at least in part on the response; and
generate, by the first machine learning model, updated offer probability information for the first task resource, the offer probability information indicating for a timeslot on a given day of the week, a probability that the first task resource will successfully complete a task.

14. The scheduling system of claim 12,
wherein the one or more computer processors are configured to execute further executable instructions to at least:
receive a scheduling constraint for the region, wherein the scheduling constraint identifies a limitation for the first task resource;
generate resource schedule metrics based at least upon timeslots associated with the first task resource within the schedule; and
determine that the schedule conforms to the scheduling constraint for the task resource based at least in part on a comparison of at least one of the resource schedule metrics with the limitation identified by the scheduling constraint.

15. The scheduling system of claim 14, wherein the limitation comprises at least one of: a number of minutes worked by he first task resource during the period of time, a duration of time the first task resource has been included on one or more schedules, a number of consecutive days worked by the first task resource, or a duration of time since the offer was made to the first task resource.

16. The scheduling system of claim 14,
wherein to identify available task resources from the plurality of task resources, the one or more computer processors are configured to execute further executable instructions to at least:
for each task resource of a plurality of task resources, identify the task resource for inclusion in the available task resources, said identifying based at least in part on a correspondence between the region and location information associated with the task resource.

17. The scheduling system of claim 12,
wherein the schedule includes offer transmission information for the first task resource, the offer transmission information identifying a message type associated with a highest probability of soliciting a response from the first task resource for an offer to the first task resource, wherein the one or more computer processors are configured to execute further executable instructions to at least:
transmit the offer for the first task resource to a communication device associated with the first task resource, wherein to transmit the offer to the communication device, the one or more computer processors are configured to execute the executable instructions to at least:
generate a message of the message type based at least in part on the offer, and
transmit the message to the communication device based at least in part on the offer transmission information.

18. The scheduling system of claim 12, wherein to generate the schedule, the one or more computer processors are configured to execute further executable instructions to at least:
generate a first candidate schedule using the second machine learning model;
generate a second candidate schedule using the second machine learning model, wherein the first candidate schedule differs from the second candidate schedule;
estimate a first metric value for the first candidate schedule for a schedule metric;
estimate a second metric value for the second candidate schedule for the schedule metric, wherein the schedule metric identifies at least one of a cost or a fill rate for a generated schedule; and
identify the first candidate schedule as the schedule based at least in part on a comparison between the first metric value and the second metric value.

19. The scheduling system of claim 18,
wherein the one or more computer processors are configured to execute further executable instructions to at least:
determine that the first metric value corresponds to a termination threshold, and wherein the one or more computer processor are configured to execute the further executable instructions to identify the first candidate schedule as the schedule in response to said determining that the first metric value corresponds to the termination threshold.

20. The scheduling system of claim 12,
wherein the one or more computer processors are configured to execute further executable instructions to at least:
estimate a first fill rate for the schedule generated by the second machine learning model, wherein the first fill rate represents a likelihood that the schedule generated by the second machine learning model will satisfy a demand for the deliveries over the period of time;
estimate a second fill rate for a second schedule different than the schedule generated by the second machine learning model, wherein the second fill rate represents a likelihood that the second schedule will satisfy a demand for the deliveries over the period of time; and determine that the first fill rate exceeds the second fill rate.

* * * * *